United States Patent [19]

Braun et al.

[11] 4,008,699
[45] Feb. 22, 1977

[54] EXTENDED THROTTLE BORE MULTI-STAGE CARBURETOR

[75] Inventors: Paul E. Braun; Melvin F. Sterner, both of Bloomfield Hills, Mich.

[73] Assignee: Ford Motor Company, Dearborn, Mich.

[22] Filed: Apr. 5, 1976

[21] Appl. No.: 674,010

[52] U.S. Cl. .................. 123/122 AB; 261/145; 261/63; 165/52; 261/DIG. 63

[51] Int. Cl.² ...................................... F02M 31/08

[58] Field of Search ............ 123/122 AB, 122 AC; 261/145, DIG. 61, DIG. 64, 63, 23 A, DIG. 63; 165/52

[56] References Cited

UNITED STATES PATENTS

| | | | |
|---|---|---|---|
| 1,282,271 | 10/1918 | Middleton | 261/DIG. 63 |
| 2,082,666 | 6/1937 | Ulrich | 123/122 AC |
| 2,395,264 | 2/1946 | Gardner | 261/23 A |
| 2,638,330 | 5/1953 | Morgenroth | 261/23 A |
| 3,310,045 | 3/1967 | Bartholomew | 261/23 A |
| 3,971,352 | 7/1976 | Marsee | 123/122 AB |
| 3,972,324 | 8/1976 | Marsee | 123/122 AB |

FOREIGN PATENTS OR APPLICATIONS 4,427  2/1907  United Kingdom ......... 123/122 AC

OTHER PUBLICATIONS

Marsee, Application B498,951, published Mar. 2, 1976 123/122 AC.

Primary Examiner—Tim R. Miles
Attorney, Agent, or Firm—Robert E. McCollum; Keith L. Zerschling

[57] ABSTRACT

A multi-stage carburetor has a primary throttle bore that is extended into the intake manifold in close proximity to the exhaust gas heated manifold floor, and a secondary bore that surrounds a portion of the primary bore and terminates at the inlet to the intake manifold so as to avoid a restriction to flow of secondary air into the manifold and past the primary passage.

7 Claims, 2 Drawing Figures

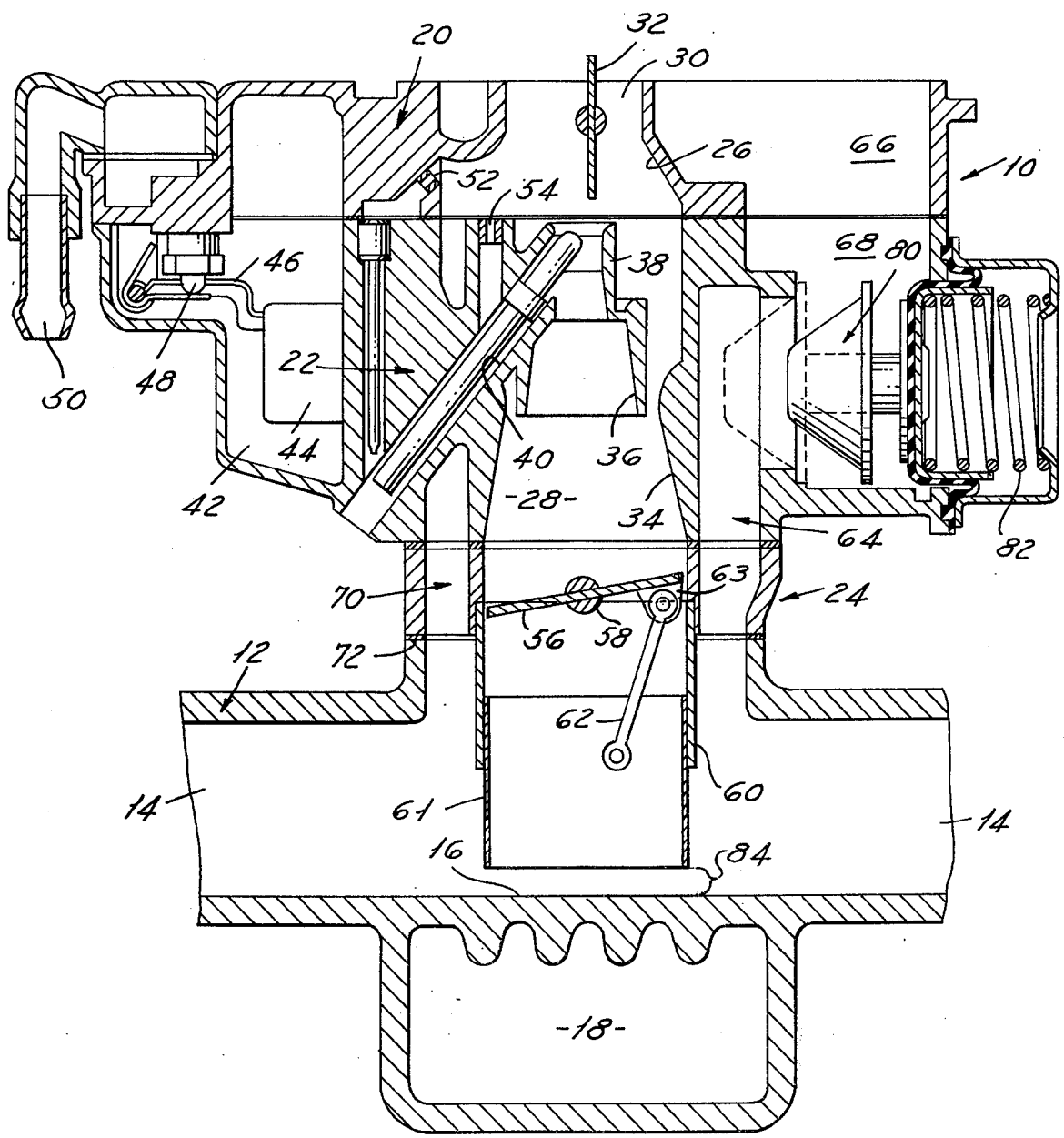

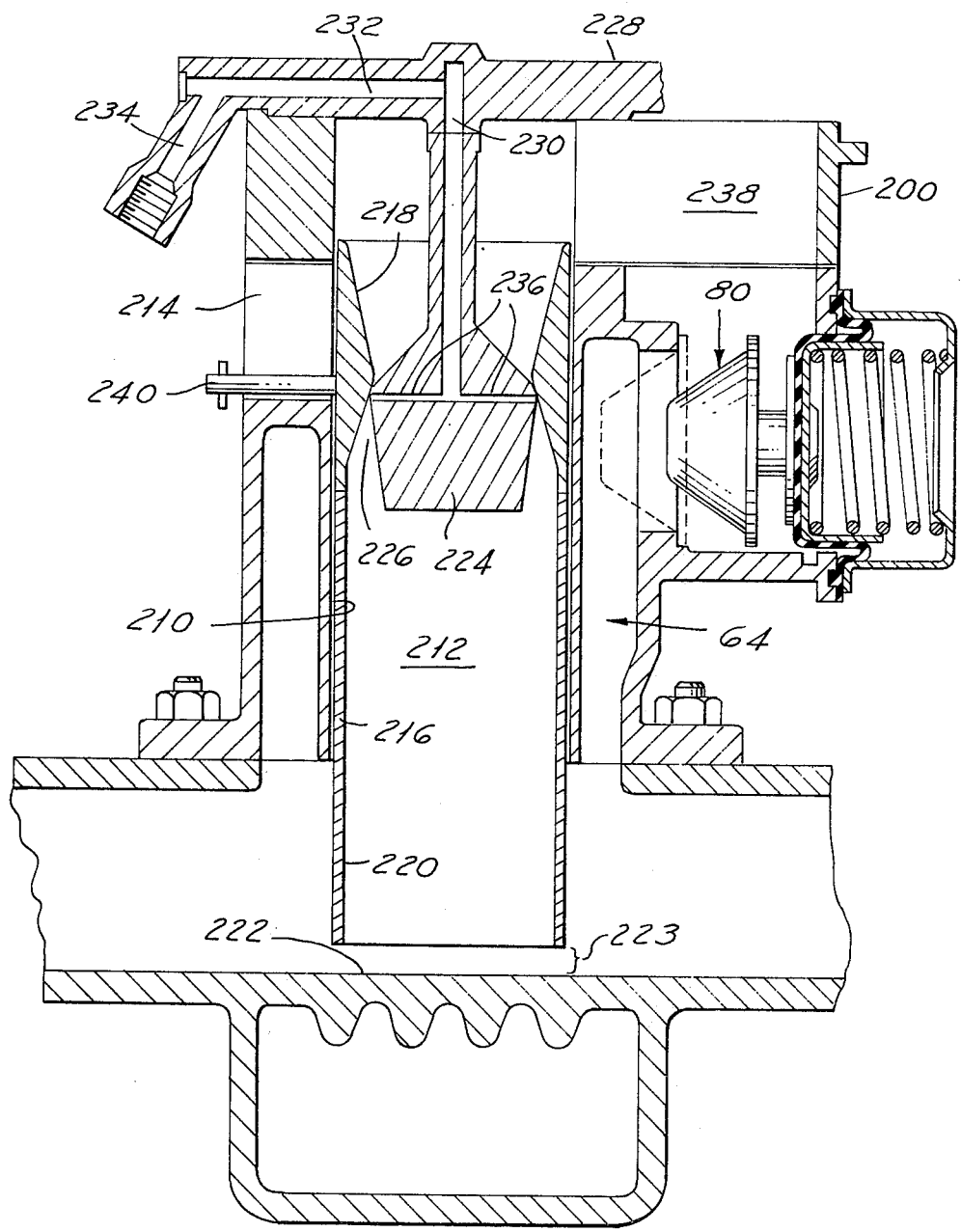

EXTENDED THROTTLE BORE MULTI-STAGE CARBURETOR

This invention relates in general to a carburetor, and more particularly to a multi-stage carburetor constructed to efficiently vaporize the fuel without causing an air flow restriction as it passes into the engine intake manifold.

Carburetors are known in which the induction passage is extended by a tube to a point near the heated intake manifold floor to provide quicker or faster fuel vaporization and, therefore, a more controlled mixture flow to the engine. The proximity of this tube to the manifold floor, however, causes an air flow restriction in a conventional four barrel carburetor construction, for example, since flow from the secondary barrels to some cylinders must pass through either the narrow space between the tube and wall or the space between the tube and manifold floor on its way to the engines cylinders. This unduly restricts the air intake capacity of the carburetor, and, therefore, is undesirable.

It is a primary objective of this invention, therefore, to provide a multi-stage carburetor with an extended throttle bore that will provide the quick vaporization of fuel desired, and a secondary air supply system constructed in a manner not to cause a restriction to air flow.

It is a further object of the invention to provide a multi-stage carburetor with primary and secondary induction passages in which the discharge end of the primary passage extends into the intake manifold in close proximity to the exhaust gas heated floor, for fuel vaporization purposes, and the secondary passage surrounds a lower portion of the primary passage but terminates at the inlet to the intake manifold so as to provide essentially an unrestricted flow into the manifold and around the extending tube without necessitating flow through the restricted space between the end of the primary tube and the manifold floor.

It is another object of the invention to provide a multi-stage carburetor of the type described above in which the throttle bore extension is vertically movable to vary the flow restriction space between the end of the tube and the manifold floor.

Other objects, features and advantages of the invention will become more apparent upon reference to the succeeding detailed description thereof, and to the drawings illustrating the preferred embodiments thereof; wherein, FIG. 1 is a cross sectional view of a portion of a downdraft carburetor embodying the invention; and, FIG. 2 is a view corresponding to the FIG. 1 showing and illustrating a modification.

FIG. 1 shows a dual stage downdraft type carburetor 10 that is located over and secured to an engine intake manifold 12. The manifold runners 14 extend essentially at right angles to the longitudinal axis of carburetor 10 for flow of the mixture to the various engine cylinders. The floor 16 of the manifold, in this case, is heated in a known manner by the passage of exhaust gases through an exhaust gas crossover passage 18 located directly beneath the floor and beneath the carburetor. This provides the usual hot-spot for vaporizing the fuel mixture flowing from the carburetor, as will be explained in more detail later.

The carburetor has the usual upper air horn portion 20, a main fuel metering body portion 22, and a throttle body portion 24, all secured together by suitable means not shown. Extending through the portions is a central bore 26 that defines a primary induction passage 28. Passage 28 has an air inlet end 30 that is adapted to receive air from the conventional air cleaner, not shown, and is, therefore, essentially at atmospheric pressure. A conventional choke valve 32 is rotatably mounted in the air horn section for controlling air flow during cold engine operating conditions, in a known manner.

The main fuel metering body portion of the passage 28 contains a primary or main fixed area venturi 34 cooperating with a pair of secondary and tertiary smaller area venturi 36 and 38 centrally located in the passage above venturi 34. A main fuel metering passage 40 supplies fuel to the tertiary venturi 38 from a passage, not shown, connected to the conventional float bowl 42. The latter contains the usual float 44 mounted on a lever 46 hinged to move against the lower side of a fuel inlet valve 48 to control the supply of fuel from a passage 50 connected to the conventional fuel pump. Suitable air bleeds 52 and 54 cooperating with the fuel passages provide an admixture or emulsion of fuel and air to venturi 38.

The throttle body portion 24 contains the usual throttle plate or valve 56 rotatably mounted on a shaft 58 for closing or fully opening the primary induction passage. The throttle bore in this case is extended beyond the lower edge of the carburetor by means of a thin sheet metal tube 60 that is pressed into the lower portion of the throttle body, as shown. A second tube 61 is loosely slidably mounted within tube 60 and extends into the intake manifold into close proximity to the floor 16 which constitutes a splash surface. Tube 61 is pivotally connected by a lever 62 to an ear 63 on throttle valve 56 so as to be vertically movable upon rotative movement of the throttle valve.

Fuel inducted through the venturi upon opening of the throttle valve mixes with the air and flows downwardly to the end of the extension tube 61. At this point, the lighter air particles are turned 90° by the engine suction to flow laterally along the manifold runners 14 towards the engine cylinders. The heavier fuel particles drop by centrifugal force to splash against the surface of floor 16, which, as described previously, is heated by the flow of engine exhaust gases through the crossover passage 18. This vaporizes the fuel particles, which are then carried into the engine cylinders by the subsequent flowing air/fuel mixture as well as by the suction of the manifold acting on the vaporized fuel itself.

The tube 61 is moved by throttle valve 56 as shown to as near the floor 16 as possible without providing undue restrictions to flow of primary air flow so that both the low flow and wide open throttle flow engine requirements will be satisfied. The end of tube 61 should be as close as possible to the floor 16 so as to force the maximum amount of fuel onto the splash surface, for vaporization, while at the same time satisfying engine flow requirements. The tube 61 moves up, therefore, in proportion to opening of the throttle valve 56, to proportionately increase the primary passage flow volume. It will be clear, therefore, that the variable area space or clearance between the end of the extension or tube 61 and the floor 16 will be a design factor to satisfy engine air flow requirements through the primary induction passage.

It should be noted at this point that the total fuel requirements of the engine are supplied through the primary venturi passage. Increased air flow requirements are satisfied in this instance by a secondary air flow system consisting of a secondary induction passage 64. The latter has an air inlet 66 that is parallel to and laterally offset from the primary inlet 30, so as to be connected to the conventional air cleaner in the same manner as air inlet 30. The inlet 66 flows air into a passage 68 in the fuel metering body portion that supplies an annular passage portion 70 that is concentric with and surrounds a lower portion of the primary induction passage 28, as shown, to provide a large secondary air flow area. The lower or discharge end of the secondary air flow passage terminates near or essentially at the lower edge of the throttle body portion 24, or at the junction of the carburetor mounting flange to the upper end of the intake manifold 72.

It will be clear that with the construction as described, the secondary air will flow relatively unrestricted into the intake manifold and not be forced to flow through the clearance space between the end of extension tube 60 and the manifold floor 16. The construction, therefore, does not create a restriction to flow of secondary air that normally occurs with a conventional four barrel or a staged, two barrel carburetor with parallel bores requiring flow in a series type relationship to the manifold.

The flow of secondary air in this case is controlled by a poppet valve 80 that is normally urged to a closed position, shown in dotted lines, by a spring 82. The valve can be either vacuum or mechanically actuated, as desired. If vacuum actuated, for example, a tap can be made to the venturi section so that secondary air supply is initiated in response to air flow through the carburetor.

Further details of construction and operation of the carburetor and intake manifold per se are not given since they are known and believed to be unnecessary for an understanding of the invention. Suffice it to say that a secondary fuel supply system would also be provided discharging fuel into the primary passage venturi 38 upon opening of poppet valve 80 to supply the extra fuel needed to assure the proper air/fuel ratio to the mixture supplied to the engine cylinders. The increase in fuel supply to the primary induction passage, however, would be only slight and not interfere with flow requirements in the clearance space 84 because approximately only one part extra fuel is required for each 15 parts of air.

FIG. 1 shows a dual stage carburetor having fixed area venturi with the movable throttle bore extension tube 61. FIG. 2 illustrates the construction when used with a variable area venturi type carburetor that also permits vertical movement of the throttle bore extension and, therefore, again provides variable clearance space for the flow from the primary induction passage into the manifold.

More particularly, the carburetor shown in FIG. 2 includes a main body portion 200 that has a central bore 210 defining the primary induction passage 212. Slidably mounted within passage 212 is a vertically movable sleeve 216, the upper end of which is formed as a fixed area venturi 218. The lower end 220 of the sleeve constitutes an extension tube in the same manner as shown at 16 in FIG. 1, and extends in close proximity towards the intake manifold floor 222 in the same manner and for the same purpose as shown in FIG. 1.

Cooperating with the venturi 218 is a fixed, centrally mounted plug 224 that is shaped as shown to provide with the venturi 218 a converging-diverging (C-D) annular flow area 226 between the two. The plug 224 is secured to an upper member 228 provided with fuel flow passages 230 and 232. The latter may be connected to any suitable source of fuel supply such as a conventional float bowl, for example, or a source of fuel under pressure, through a connecting line 234. The plug 224 has a pair of lateral passages 236 that exit at the minimum cross sectional area or throat of the converging-diverging flow passage 226 for induction of fuel into this passage. It should be noted that the plug and venturi contours are such that sonic velocity will be provided to the flow over most of the intake manifold vacuum operating range of the engine.

The supply of air to induction passage 212 is provided by an inlet 238 connected to the conventional air cleaner, not shown. The slidable venturi sleeve 216 is shown as being movable vertically by an actuator 240 that is movable in an opening 214 in any desired manner according to engine operation, such as, for example, by being connected to the throttle linkage. With such a connection, therefore, depression of the conventional accelerator pedal will cause the vertical upward movement of the sleeve 216 from the idle speed position shown to gradually enlarge the C-D flow passage 226 to increase air flow as well as fuel inducted from passages 236, to satisfy the increased engine requirements. Concurrently, the tube 220 will be raised to increase the clearance space between the end of the tube and the floor 222, to increase the flow volume capacity in proportion to the increase in the D—D flow passage area.

Conversely, release of the accelerator pedal will cause a downward movement of the venturi 218 towards the position shown to progressively decrease the C-D annular flow area and the clearance space 223 in accordance with engine requirements. As this is happening, the air/fuel mixture flowing through the sleeve 216 and extension 220 will splash against the heated floor 222 of the intake manifold, thereby vaporizing the fuel for passage into the engine cylinders.

The secondary air supply system in FIG. 2 is constructed and operates in essentially the same manner as that shown in FIG. 1 and, therefore, will not be repeated. In brief, air flow through the inlet 238, upon opening of the poppet valve 80 either mechanically or by vacuum, will permit the flow of secondary air down the secondary induction passage 64 and into the engine intake manifold around the tube 220 in a nonrestricting flow manner similar to that already described in connection with the FIG. 1 shown.

From the foregoing, it will be clear that the invention provides a multi-stage carburetor that is connected to the engine intake manifold in such a way as to vaporize the fuel delivered from the carburetor to the engine and yet not provide a restriction to flow of secondary air into the system.

While the invention has been shown and described in its preferred embodiments, it will be clear to those skilled in the arts to which it pertains that many changes and modifications may be made thereto without departing from the scope of the invention.

We claim:

1. In combination, a dual stage carburetor having primary stage and secondary stage induction passages each having an air inlet at its upper end and a discharge opening at the other lower end, an engine intake manifold extending essentially at right angles to the axis of the passages and having an engine exhaust gas heated floor portion directly beneath and aligned with the lower discharge ends of the primary and secondary induction passages for the splash of fuel against the floor portion to warm the fuel and aid in the vaporization thereof, the primary induction passage having a fuel metering venturi receiving fuel therein for induction of fuel into the manifold, the primary passage discharge end extending into the intake manifold into close proximity to the floor portion but spaced therefrom so as to vaporize the fuel mixture discharged thereagainst while permitting a controlled flow of mixture out of the space between the primary passage and floor portion towards the engine cylinders, the discharge end of the secondary induction passage being concentric with and surrounding a lower portion of the primary passage and terminating adjacent the inlet to the intake manifold so as to discharge air into the manifold in a manner bypassing the flow restriction caused by the extension of the primary passage into close proximity to the floor portion, and control means controlling flow of air through the secondary passage.

2. A combination as in claim 1, the primary passage discharge end comprising thin wall tube means extending from a point adjacent the discharge end of the secondary passage.

3. A combination as in claim 1, the primary passage discharge end comprising a tube means slidable towards and away from the floor portion, and means to slide the tube means.

4. A combination as in claim 3, including a throttle valve mounted for a rotative movement across the primary induction passage to control flow therethrough, and the means to slide the tube means comprising connecting means pivotally connecting the tube means and the throttle valve whereby rotative movement of the throttle valve slides the tube means.

5. A combination as in claim 1, the control means comprising a spring closed valve normally closing the secondary passage at its air inlet end, and openable to supply secondary air to the manifold.

6. A combination as in claim 1, the primary passage being defined by an upper fixed tubular wall portion vertically slidably receiving therein a sleeve including the lower discharge extending portion, the upper wall portion including a fixed area venturi, a conically shaped plug axially fixed concentrically within the venturi for cooperation therewith to define therebetween an annular converging-diverging flow section that varies in area as a function of the vertical movement of the sleeve, and means to move the sleeve to vary the flow area, the movement also moving the extending portion to vary the space between the extending portion and the manifold floor portion to change air flow capacity therebetween.

7. A combination as in claim 6, the control means including a spring closed valve normally closing the air inlet end of the secondary passage and openable to supply secondary air to the manifold.

* * * * *